United States Patent [19]
Hock et al.

[11] Patent Number: 5,483,896
[45] Date of Patent: Jan. 16, 1996

[54] PYROTECHNIC INFLATOR FOR AN AIR BAG

[75] Inventors: Christopher Hock, Uintah; Linda M. Rink, Liberty; Wesley L. Hatt, Centerville, all of Utah

[73] Assignee: Morton International, Inc., Chicago, Ill.

[21] Appl. No.: 273,650

[22] Filed: Jul. 12, 1994

[51] Int. Cl.⁶ ........................................ C06D 5/00
[52] U.S. Cl. ................. 102/530; 280/741; 422/166
[58] Field of Search .......................... 102/530, 531, 102/469, 470, 472; 280/736, 740, 741; 422/164–167

[56] References Cited

U.S. PATENT DOCUMENTS

| | | | |
|---|---|---|---|
| 1,179,686 | 4/1916 | Van Kampen et al. | 102/518 |
| 2,995,088 | 8/1961 | Asplund | 102/5 |
| 3,853,332 | 12/1974 | Lynch | 422/166 |
| 5,000,479 | 3/1991 | Werner et al. | 280/736 |
| 5,346,254 | 9/1994 | Esterberg | 280/741 |
| 5,351,619 | 10/1994 | Chan et al. | 102/289 |
| 5,368,329 | 11/1994 | Hock | 102/531 |
| 5,372,380 | 12/1994 | Duffy et al. | 280/740 |
| 5,374,407 | 12/1994 | Decker | 280/741 |

FOREIGN PATENT DOCUMENTS

| | | | |
|---|---|---|---|
| 81971 | 7/1895 | Germany | 102/470 |
| 5048797 | 5/1975 | Japan . | |
| 1632484 | 3/1991 | U.S.S.R. | 422/167 |

*Primary Examiner*—Harold J. Tudor
*Attorney, Agent, or Firm*—Philip C. Peterson; Taylor J. Ross; Gerald K. White

[57] ABSTRACT

A pyrotechnic inflator for an air bag includes a housing for containing gas generating material for inflating an air bag. The housing has a wall formed of rigid, porous material and serves both as a filter for entrapping contaminants from the gas that is generated within as the gas passes outward through the wall into the air bag and cools the gas by absorbing heat therefrom. Gas generating material and an ignition train is hermetically sealed in a bag or packet inside the porous housing which serves triple duty as a solid pyrotechnic container, a gas filter and a gas cooler.

18 Claims, 1 Drawing Sheet

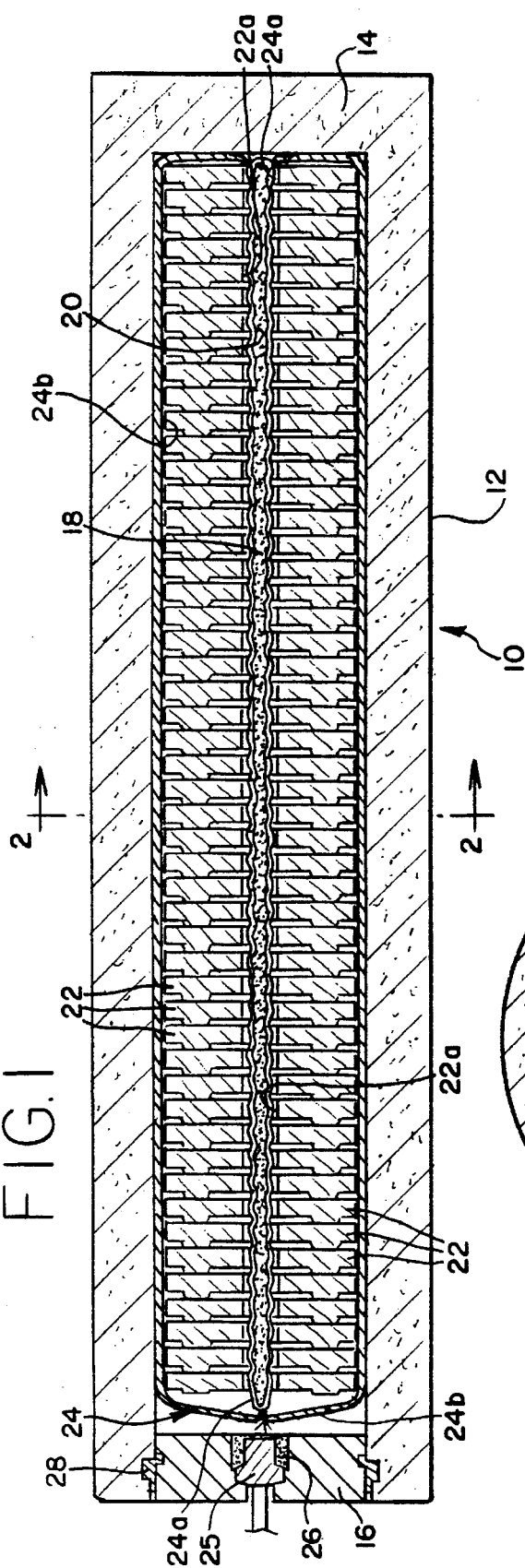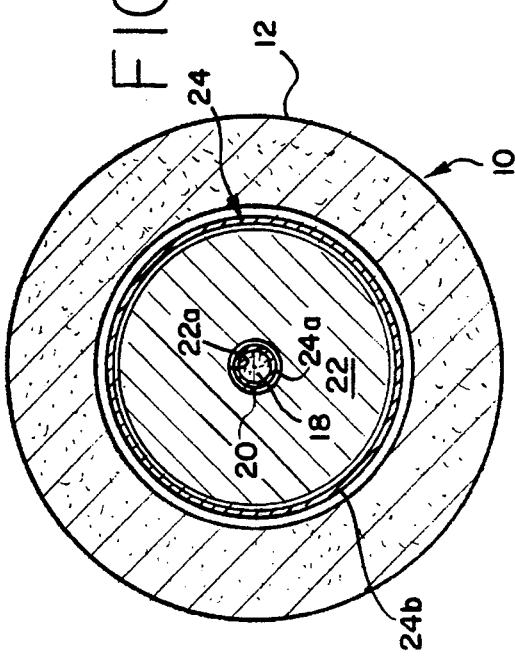

PYROTECHNIC INFLATOR FOR AN AIR BAG

BACKGROUND OF THE INVENTION

1. Field of the Invention

The present invention relates to a new and improved pyrotechnic inflator for air bag cushions used in a motor vehicle. In particular, the new inflator employs a housing formed of strong, rigid, lightweight, porous metal or ceramic material for containing gas generating material and which housing itself also functions to filter and cool when the generating material is reacted so that the generated gas flows outwardly through the porous wall material to rapidly inflate an air bag.

2. Background of the Prior Art

Presently available pyrotechnic inflators for air bags and the like utilize a container or canister formed of steel or other metal and having a plurality of ports formed in the walls for directing the gas generated within the canister to flow outwardly and inflate an associated air bag. Prior inflators have required a separate filter mounted inside the inflator housing or canister for entrapping contaminants from the gas as it moves outwardly toward the ports to inflate the air bag.

OBJECTS OF THE INVENTION

It is an object of the present invention to provide a new and improved pyrotechnic inflator for air bags and in particular a new and improved pyrotechnic inflator employing a housing formed of rigid, strong, lightweight, porous metal or ceramic material, which also functions as a filter for entrapping impurities from the gas and absorbs heat from the gas as it passes outwardly through the porous housing walls to inflate the air bag.

It is another object of the invention to provide a new and improved air bag inflator of the type described which eliminates the need for a separate filter element.

Still another object of the present invention is to provide a new and improved air bag inflator wherein the housing itself filters and cools the gas as it passes outwardly through the porous housing to fill an air bag.

Yet another object of the invention is to provide a new and improved air bag inflator of the type described having a porous housing or containment structure for containing gas generating material hermetically sealed therein.

Still another object of the present invention is to provide a new and improved air bag inflator having a relatively large area for discharging the flow of gas into the air bag during deployment.

BRIEF SUMMARY OF THE PRESENT INVENTION

The foregoing and other objects of the present invention are accomplished in a new and improved pyrotechnic inflator for an air bag which employs a housing formed of strong, rigid, lightweight, porous metal or ceramic material for containing gas generating material sealed inside. The porous structure of the housing wall serves as a filter for entrapping contaminants from the gas as it passes out through the wall to rapidly inflate an associated air bag. The housing wall also functions to cool the hot gases by absorbing heat therefrom and eliminates the requirement or need for a separate filter.

BRIEF DESCRIPTION OF THE DRAWINGS

For a better understanding of the present invention, reference should be had to the following detailed description taken in conjunction with the drawings, in which:

FIG. 1 is a longitudinal cross-sectional view of a new and improved pyrotechnic inflator for an air bag in accordance with the features of the present invention; and FIG. 2 is a transverse cross-sectional view taken substantially along lines 2—2 of FIG. 1.

DETAILED DESCRIPTION OF A PREFERRED EMBODIMENT OF THE INVENTION

Referring now more particularly to the drawing, therein is illustrated a new and improved pyrotechnic inflator 10 for inflating an air bag safety cushion used in a motor vehicle. The inflator 10 includes an elongated, generally cylindrical housing or canister 12 having an integrally formed circular wall 14 at a closed end thereof and a separate cap or base 16 at an opposite end. Positioned within the housing or canister 12 is a stack of wafer like, annular discs 22 of gas generating material such as sodium azide or other solid material commonly used for generating air bag inflation gas. Surrounding the gas generating wafers 22 there is provided a thin layer of ignition material in the form of a bag or packet 24 formed of a sheet of "Teflon" plastic film having a thin layer of magnesium bonded thereto or other type of metallized plastic sheet material. One type of film is called "Enerfoil" and is manufactured by a company called I.C.I. located in Wilmington, Del. The ignition material is formed into a bag or jacket 24 which completely surrounds and encloses the stack of gas generating wafers 22 exteriorly, and also is in coaxial alignment with and extends through center openings 22a provided in the wafers. This bag 24 is closed and sealed in order to prevent moisture ingestion during the lifetime of the inflator 10.

Alternatively, along the central longitudinal axis of the housing 12 there is provided a central ignition core 18 of material which acts as an ignitor when the inflator 10 is activated to generate gas for inflating an air bag.

The ignition core 18 is contained within a sealed tube or sleeve 20 formed of thin aluminum or magnesium foil, plastic wrapping material such as polyethylene or "Teflon" plastic sheeting in order to prevent moisture ingestion during the lifetime of the inflator 10. The ignition tube 20 also aids in inserting the central core 18 of ignition material into the housing 12 because the material is generally a granular, powdered or particulate type of material such as $BKNO_3$. The core of ignition material 18 is in coaxial alignment with and extends through center openings 22a in the stack of wafer-like, annular discs 22 of gas generating material such as sodium azide or other solid materials commonly used for generating air bag inflation gas. The central ignition core 18 and the stack of solid gas generating discs 22 are all contained in the hermetically sealed bag or package 24 formed of thin, aluminum, magnesium or "Teflon" plastic metallized foil to prevent moisture ingestion during the lifetime of the inflator 10.

A squib 25 is mounted in a recess at the center of the end cap 16 and when activated by an electrical signal, causes the material in the elongated core 18 and the jacket 24, to rapidly ignite, burning from the cap 16 to the closed end wall 14 of the porous housing 12. As this occurs, the gas generating wafers 22 are ignited and gas is rapidly produced for filling the air bag. This gas flows outwardly through the myriad of pores and tortuous paths provided in the porous body wall of the housing 12. Gas pressures in the range of 2000 to 2500 psi may be generated within the housing.

The housing 12 functions as a gas filter for entrapping larger particulates and other contaminants from the hot gases flowing rapidly out to inflate the air bag. This arrangement eliminates the requirement for a separate filter element. A variety of porous materials of suitable strength are available such as porous nickel, iron and aluminum or a reticulate structure initially formed on a base of open-celled carbon or urethane foam on which metal alloys or ceramic materials are coated in a chemical vapor deposition process. After the deposition of the metal, metal alloys or ceramic material on the base, the foam base material itself can be burned out or eliminated in a heating or sintering process leaving a housing 12 which is strong, rigid and porous to accommodate the outflow of hot gases generated from the discs 22.

The strong, rigid, porous reticulated structure of the housing 12 can be formed of metal and/or alloys such as aluminum, copper, iron, molybdenum, nickel, zirconium, niobium and tungsten. Alternatively, a porous ceramic structure can be utilized for the housing 12. Materials such as silica carbide, silica dioxide, alumina silicate mixture, mullite and alumina are available and suitable. All of these materials can be readily formed to the desired shape of the housing 12 and the pore sizes can be selected to provide the proper filtration and cooling. For example, the material of the housing 12 may have a "pores per square inch" rating in the range of 10 to 100. This range of porosity offers suitable resistance to gas flow and because the entire wall surface of the housing 12 is available, a large flow cross-section is provided in contrast to a relatively small flow cross-section of the ports in a typical prior art, solid metal wall inflator.

The reticulated structure thus formed of metal alloy or ceramic material is strong, light in weight, and able to handle the high momentary pressures involved without fracturing as well as resist corrosion from exterior sources or degradation over a long period of time. Because the gas generating material of the wafers 22 is hermetically sealed within a containing bag 24, long life is assured. Moreover, the containment tube 20 or seal around the inner core 18 of the ignition train provides further protection against moisture and greatly simplifies the overall assembly of all of the ignition train and gas generating materials and insertion thereof into the housing 12.

The porous structure of the housing 12 eliminates the requirement for a separate filter element so that other internal walls normally provided may be completely eliminated. The porous housing 12 also provides excellent cooling characteristics by rapidly absorbing heat from the hot gases flowing therethrough.

During assembly of the ignitor, a flat section of film 24 is formed around a narrow rod and affixed tightly to the rod. The gas generant wafers 22 are then inserted over the film on the rod to form a stack. The remaining section of the film 24 is then folded back over the stack of wafers 22 and thus itself to extend back along the stack to the top again forming an encapsulating jacket. The jacket thus forms a double wall; one inner wall 24a extending interiorly through the stack of gas generating wafers 22, the other outer wall 24b extending exteriorly around the stack of gas generating wafers. The exteriorly extending wall section 24b is then closed on itself, hermetically sealing the wafers 22 inside.

Alternatively during assembly of the ignitor, a packet or bag 24 is formed initially containing a stack of the gas generating wafers 22 and the sealed ignition core 18 is pre-assembled into the jacket 24. The whole packet is then easily inserted into place in the housing 12 from the open end. An end cap 16 containing the igniting squib 25 is next inserted into place to close the open end of the housing 12. A ring of molten metal 28 is introduced into a grooved wall region between the outer edge of the end cap 16 and the adjacent internal surface of the body 12 such as by liquid metal injection. When the molten material 28 solidifies a positive seal and locking engagement between the end cap or base 16 and the porous housing 12 is produced.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A pyrotechnic inflator for an airbag, comprising:

housing means for containing gas generator means for inflating an airbag, and having an elongated, hollow, tubular side wall of substantial thickness and strength including an integral end wall, said tubular side wall and said end wall being formed in one piece and said walls formed of rigid porous material for filtering and cooling gas from said gas generator passing through said walls to inflate said airbag;

gas generator means sealed inside said housing means for activation to rapidly generate gas to pass outwardly through said walls into said airbag;

said gas generator means including a core of ignitable material centrally positioned inside a packet of gas generating pyrotechnic material, said pyrotechnic material contained in a hermetically sealed jacket, which Jacket is contained in said housing means.

2. The airbag inflator of claim 1, wherein:

said walls of said housing means are formed of a metal alloy having pores and adapted for filtering and entrapping contaminants from said gas and cooling said gas flowing to inflate said airbag.

3. The airbag inflator of claim 1, wherein:

said walls of said housing means are formed of a porous ceramic material adapted for filtering and entrapping contaminants from said gas and cooling said gas flowing to inflate said airbag.

4. The airbag inflator of claim 1, wherein:

said gas generator means includes a packet of gas generating pyrotechnic material contained in a hermetically sealed jacket of thin, moisture-impervious, wrapping material.

5. The airbag inflator of claim 4, wherein:

said sealed jacket is formed of flexible metal sheeting.

6. The airbag inflator of claim 5, wherein:

said flexible metal sheeting comprises a foil of magnesium.

7. The inflator of claim 5, wherein:

said flexible metal sheeting comprises a foil of aluminum.

8. The airbag inflator of claim 4, wherein:

said sealed jacket is formed of resinous plastic film.

9. The airbag inflator of claim 8 wherein:

said jacket is formed of ignition material and acts as an ignitor of said gas generating material.

10. The airbag inflator of claim 8, wherein:

said resinous plastic film is formed of polytetraethylene resin.

11. The airbag inflator of claim 1, wherein:

said gas generating pyrotechnic material comprises a plurality of annular elements in a stack mounted on said core of ignitable material.

12. An inflator for an airbag, comprising:

housing means having a unitary hollow tubular body closed at opposite ends, said tubular body being formed of strong, rigid porous material of substantial thickness for holding gas generator means and having pores defining a plurality of tortuous paths for filtering and entrapping contaminants from gas flowing from said gas generator means outwardly through said paths to inflate an airbag, said body including at least one circumferential groove opening onto an interior of said body, said groove being located adjacent one of said ends;

gas generator means located within said interior of said tubular body and enclosed in a hermetically sealed jacket for generating gas upon ignition to pass outwardly through said tubular body of said housing means for inflating said airbag;

a base closing said tubular body at said one end of said body, said base including a peripheral groove opening at least partially onto said circumferential groove;

a solidified ring of initially liquid metal injected between and filling said grooves of said tubular body and said base and thereafter solidified to secure and seal said base to said housing means at said one end; and an initiator connected to said base.

13. The inflator of claim 12, including:

said initiator being incorporated with said base for activating said gas generator means.

14. The inflator of claim 12, wherein:

said tubular body has an integral one-piece end wall at an end opposite said base.

15. The inflator of claim 12, wherein:

said jacket of said gas generator means is formed of thin, non-porous film.

16. The inflator of claim 15, wherein:

said gas generator means includes a mass of pyrotechnic material and an ignition train centrally disposed in said mass of pyrotechnic material.

17. The inflator of claim 16, wherein:

said ignition train includes a core of ignition material hermetically sealed in a bag of moisture impervious film.

18. The inflator of claim 17, wherein:

said mass of pyrotechnic material includes a stack of annular discs mounted on said core of ignition material.

* * * * *